US012405543B2

(12) United States Patent
Kyuushima et al.

(10) Patent No.: US 12,405,543 B2
(45) Date of Patent: Sep. 2, 2025

(54) TONER

(71) Applicant: CANON KABUSHIKI KAISHA, Tokyo (JP)

(72) Inventors: Hirofumi Kyuushima, Tokyo (JP); Takayuki Toyoda, Shizuoka (JP); Naoya Isono, Shizuoka (JP); Tomoya Nagaoka, Tokyo (JP); Masao Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 663 days.

(21) Appl. No.: 17/804,879

(22) Filed: Jun. 1, 2022

(65) Prior Publication Data

US 2022/0390870 A1 Dec. 8, 2022

(30) Foreign Application Priority Data

Jun. 8, 2021 (JP) ................................ 2021-096043

(51) Int. Cl.

*G03G 9/09* (2006.01)
*G03G 9/08* (2006.01)
*G03G 9/087* (2006.01)
*G03G 9/097* (2006.01)

(52) U.S. Cl.

CPC .......... *G03G 9/092* (2013.01); *G03G 9/0821* (2013.01); *G03G 9/08755* (2013.01); *G03G 9/08782* (2013.01); *G03G 9/09733* (2013.01)

(58) Field of Classification Search

CPC ... G03G 9/092; G03G 9/0821; G03G 9/09733
See application file for complete search history.

(56) References Cited

U.S. PATENT DOCUMENTS 7,141,342 B2 11/2006 Toyoda
7,264,910 B2 9/2007 Toyoda
7,288,357 B2 10/2007 Toyoda
7,482,105 B2 1/2009 Hirose et al.
7,833,685 B2 11/2010 Tanaka
7,833,687 B2 11/2010 Kato
8,211,606 B2 7/2012 Murai
8,367,289 B2 2/2013 Isono
8,377,616 B2 2/2013 Tani
8,440,382 B2 5/2013 Isono
8,497,054 B2 7/2013 Sugiyama
8,507,168 B2 8/2013 Hiraoka et al.
8,557,492 B2 10/2013 Hayashi et al.
8,628,899 B2 1/2014 Kawamura
8,652,737 B2 2/2014 Handa
8,697,327 B2 4/2014 Shibata
8,778,581 B2 7/2014 Nonaka
8,815,484 B2 8/2014 Tanaka
8,916,319 B2 12/2014 Ikeda
8,940,467 B2 1/2015 Hashimoto
9,146,485 B2 9/2015 Tani
9,158,216 B2 10/2015 Shimano
9,377,705 B2 6/2016 Shimano
9,383,668 B2 7/2016 Noji
9,500,972 B2 11/2016 Tanaka
9,556,290 B2 1/2017 Nishiura
9,575,424 B2 2/2017 Nakagawa
9,599,919 B2 3/2017 Isono
9,658,549 B2 5/2017 Tanaka
9,715,187 B2 7/2017 Mukumoto
9,785,068 B2 10/2017 Umeda
9,785,071 B2 10/2017 Shimano
9,829,814 B2 11/2017 Yoshida
9,829,816 B2 11/2017 Tanaka
9,835,964 B2 12/2017 Yoshida
9,857,711 B2 1/2018 Yoshida
9,904,193 B2 2/2018 Nakagawa
9,958,801 B2 5/2018 Tanaka
10,078,279 B2 9/2018 Nakagawa
10,101,681 B2 10/2018 Tagawa
10,151,990 B2 12/2018 Suzuki
10,216,107 B2 * 2/2019 Tsubaki ............... G03G 9/0806
10,353,310 B2 7/2019 Fujita et al.
(Continued)

FOREIGN PATENT DOCUMENTS

| | | | | |
|---|---|---|---|---|
| EP | 1 950 260 | A1 | | 7/2008 |
| JP | 8-160660 | A | | 6/1996 |
| JP | 2000-35692 | A | | 2/2000 |
| JP | 2003255586 | A | * | 9/2003 |
| JP | 2006-201563 | A | | 8/2006 |
| JP | 2008-102396 | A | | 5/2008 |
| JP | 2008-233567 | A | | 10/2008 |
| JP | 2010-145946 | A | | 7/2010 |
| JP | 4662475 | B2 | * | 3/2011 |
| JP | 2011215311 | A | * | 10/2011 |
| JP | 2012-208219 | A | | 10/2012 |

(Continued)

OTHER PUBLICATIONS

Kaneko, Machine translation of JP2011-215311A, Oct. 27, 2011 (Year: 2011).*

(Continued)

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising a binder resin, wherein the toner particle further comprises a compound represented by a following formula (1) and a pigment having a quinacridone structure;

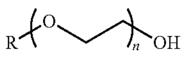

(1)

where, in the formula (1), R represents a linear or branched alkyl group having 4 to 22 carbon atoms, and n is an integer of 1 to 4.

8 Claims, No Drawings

(56) References Cited

U.S. PATENT DOCUMENTS

| | | | |
|---|---|---|---|
| 10,670,982 | B2 | 6/2020 | Yamashita et al. |
| 10,732,529 | B2 | 8/2020 | Yoshiba |
| 10,732,530 | B2 | 8/2020 | Matsui |
| 10,747,136 | B2 | 8/2020 | Kenmoku |
| 10,795,275 | B1 | 10/2020 | Srinivasan et al. |
| 10,877,388 | B2 | 12/2020 | Aoki |
| 10,877,389 | B2 | 12/2020 | Kamikura |
| 10,948,839 | B2 | 3/2021 | Tsubaki |
| 11,079,695 | B2 | 8/2021 | Sato |
| 11,086,242 | B2 | 8/2021 | Isono |
| 11,099,493 | B2 | 8/2021 | Komiya |
| 11,112,708 | B2 | 9/2021 | Uratani |
| 11,181,844 | B2 | 11/2021 | Nagaoka |
| 11,181,845 | B2 | 11/2021 | Shimoda |
| 11,249,412 | B2 | 2/2022 | Kawamura |
| 11,262,666 | B2 | 3/2022 | Yoshiba |
| 11,287,758 | B2 | 3/2022 | Matsui |
| 11,397,386 | B2 | 7/2022 | Kyuushima |
| 2006/0177754 | A1 | 8/2006 | Miyakawa et al. |
| 2007/0111124 | A1 | 5/2007 | Yuasa et al. |
| 2008/0299482 | A1 | 12/2008 | Kato |
| 2010/0035171 | A1 | 2/2010 | Watanabe |
| 2010/0159381 | A1 | 6/2010 | Takagi et al. |
| 2011/0143278 | A1 | 6/2011 | Iftime |
| 2012/0301821 | A1 | 11/2012 | Kim et al. |
| 2013/0202998 | A1 | 8/2013 | Higashi |
| 2013/0252159 | A1 | 9/2013 | Kawakami et al. |
| 2014/0356778 | A1 | 12/2014 | Wolfe |
| 2014/0356779 | A1 | 12/2014 | Hasegawa |
| 2014/0377697 | A1 | 12/2014 | Nishiura |
| 2015/0004539 | A1 | 1/2015 | Watanabe |
| 2019/0040423 | A1 | 2/2019 | Noba et al. |
| 2019/0107792 | A1 | 4/2019 | Koyama et al. |
| 2019/0258186 | A1 | 8/2019 | Yamashita et al. |
| 2020/0103776 | A1 | 4/2020 | Kinumatsu et al. |
| 2020/0292956 | A1 | 9/2020 | Amano et al. |
| 2020/0341395 | A1 | 10/2020 | Ookubo |
| 2021/0132519 | A1 | 5/2021 | Hashimoto |
| 2021/0165364 | A1 | 6/2021 | Kinumatsu et al. |
| 2021/0286281 | A1 | 9/2021 | Nishikawa |
| 2021/0286283 | A1 | 9/2021 | Nagaoka |
| 2021/0294238 | A1 | 9/2021 | Hashimoto |
| 2021/0302856 | A1 | 9/2021 | Nagashima |
| 2021/0311405 | A1 | 10/2021 | Shiotari |
| 2021/0318631 | A1 | 10/2021 | Isono |
| 2021/0405549 | A1 | 12/2021 | Ookubo |
| 2022/0075284 | A1 | 3/2022 | Nakayama |
| 2022/0128915 | A1 | 4/2022 | Toyoda |
| 2022/0128919 | A1 | 4/2022 | Kawamura |
| 2022/0146953 | A1 | 5/2022 | Kyuushima |
| 2022/0146954 | A1 | 5/2022 | Kato |
| 2022/0390871 | A1 | 12/2022 | Isono et al. |

FOREIGN PATENT DOCUMENTS

| | | | |
|---|---|---|---|
| JP | 2013-519116 | A | 5/2013 |
| JP | 2013-205593 | A | 10/2013 |
| JP | 2014-211560 | A | 11/2014 |
| JP | 2015-152784 | A | 8/2015 |
| JP | 2016-218208 | A | 12/2016 |
| JP | 2017-167524 | A | 9/2017 |
| JP | 2018-84774 | A | 5/2018 |
| JP | 2019-144437 | A | 8/2019 |
| JP | 2020-56914 | A | 4/2020 |
| JP | 2020-148928 | A | 9/2020 |

OTHER PUBLICATIONS

Sugiyama, Machine translation of JP4662475B2, Mar. 30, 2011 (Year: 2011).*

Kitani, Machine translation of JP2003-255586A, Sep. 10, 2003 (Year: 2003).*

Fedor, Robert F., A Method for Estimating Both the Solubility Parameters and Molar Volumes of Liquids, Pol. Eng. Sci., vol. 14, No. 2 (1984) 147-54.

U.S. Appl. No. 17/660,138, Keisuke Adachi, Apr. 21, 2022.

U.S. Appl. No. 17/804,880, Tomoya Nagaoka, Jun. 1, 2022.

U.S. Appl. No. 17/804,882, Naoya Isono, Jun. 1, 2022.

U.S. Appl. No. 17/804,883, Takayuki Toyoda, Jun. 1, 2022.

U.S. Appl. No. 17/805,357, Kenji Aoki, Jun. 3, 2022.

CAB-O-SIL TS-720 Fumed Silica (Year: 2024).

* cited by examiner

TONER

BACKGROUND OF THE INVENTION

Field of the Invention

The present disclosure relates to a toner that can be used for forming a toner image by developing an electrostatic latent image formed by a method such as an electrophotographic method, an electrostatic recording method, or a toner jet recording method.

Description of the Related Art

Users' requirements related to electrophotographic technology used in copiers, printers, facsimile receivers, and the like are becoming more stringent over the years with the development of equipment. In recent years, advertising and design applications have expanded, and high color reproducibility is required for output images. Accordingly, it is strongly required to expand the color gamut and improve the tinting strength of the toner used for image formation.

Means for improving the tinting strength of toner can be exemplified by a method for improving the dispersibility of a colorant contained in the toner. In electrophotographic technology, a toner is fixed to a medium such as paper by receiving heat and pressure from a fixing device. By improving the dispersibility of the colorant contained in the toner, the hiding rate of the medium surface by the colorant is improved, and the tinting strength is improved. A dispersing agent is often used as a means of improving the dispersibility of colorants.

For example, Japanese Patent Application Publication No. 2018-084774 discloses a toner in which a polymer dispersing agent is mixed to improve the dispersibility of a colorant. Further, Japanese Patent Application Publication No. 2013-205593 discloses a toner using a block copolymer having a vinylpyridine monomer unit block as a dispersing agent.

SUMMARY OF THE INVENTION

It is recognized that these techniques improve the dispersibility of colorants. However, it has been found that when a dispersing agent having a high molecular weight is used, a polymer bridges between the two colorant particles, thereby causing aggregation, so that sufficient dispersibility cannot be obtained. In addition, bridging between the colorant particles increases the crosslinking density inside the toner, making it difficult for the toner to melt, and thus the fixability to paper is lowered.

In addition, a pigment with a quinacridone structure having weather resistance and bright color is often used as a toner colorant. The quinacridone structure is considered to have excellent weather resistance because intermolecular hydrogen bonds are formed due to carbonyl groups and imino groups and because the structure has strong crystals. However, it has been found that when a pigment having a quinacridone structure is used as a colorant, aggregation due to hydrogen bonds is likely to occur and the tinting strength is lowered.

The present disclosure provides a toner having improved pigment dispersibility and improved tinting strength without deteriorating the fixability to paper even when a pigment having a quinacridone structure is used.

The present disclosure relates to a toner comprising a toner particle comprising a binder resin, wherein the toner particle further comprises a compound represented by a following formula (1) and a pigment having a quinacridone structure;

where, in the formula (1), R represents a linear or branched alkyl group having 4 to 22 carbon atoms, and n is an integer of 1 to 4.

(1)

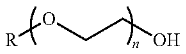

According to the present disclosure, it is possible to provide a toner having improved pigment dispersibility and improved tinting strength without deteriorating the fixability to paper even when a pigment having a quinacridone structure is used. Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily.

The embodiment will be specifically described below.

The present disclosure relates to a toner comprising a toner particle comprising a binder resin, wherein the toner particle further comprises a compound represented by a following formula (1) and a pigment having a quinacridone structure;

where, in the formula (1), R represents a linear or branched alkyl group having 4 to 22 carbon atoms, and n is an integer of 1 to 4.

(1)

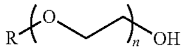

The present inventors have found that the toner having a high tinting strength is obtained without deteriorating the fixability to paper as a result of comprising a compound represented by the formula (1) (hereinafter, also referred to as compound (1)) and a pigment having a quinacridone structure (hereinafter, also referred to as a quinacridone pigment). The present inventors consider the detailed mechanism as follows.

The toner melts and deforms upon receiving heat and pressure from a fixing device and is fixed to the paper, and when the toner melts and deforms, the quinacridone pigment dispersed therein receives a strong external force. It is considered that when the quinacridone pigment receives an external force, intermolecular hydrogen bonds due to the carbonyl groups and imino groups of the quinacridone structure work to cause aggregation. That is, the pigment dispersibility after fixing to paper is lowered, and the tinting strength is lowered.

However, it is considered that the inclusion of the compound (1) in addition to the quinacridone pigment can suppress the aggregation of the pigment and improve the dispersibility. Specifically, when the quinacridone pigment receives an external force at the time of fixing, the compound (1) also receives an external force at the same time, but since the compound (1) is present as a molecule, the compound (1) easily moves inside the binder resin. It is presumed that the ether segment and the hydroxy group of the compound (1) specifically coordinate with the imino groups and the carbonyl groups and suppress the aggregation of the quinacridone pigment.

In the formula (1), R represents a linear or branched alkyl group having from 4 to 22 carbon atoms, and n is an integer of from 1 to 4. In the compound (1), when the number of carbon atoms in R is less than 4, steric hindrance due to the coordinated compound (1) is unlikely to occur, and the suppression of aggregation of the quinacridone pigment is insufficient, so that the pigment dispersibility after fixing is lowered and the tinting strength is reduced. Further, when the number of carbon atoms in R exceeds 22, the molecular weight is large and the movement inside the binder resin is restricted, so that the effect of suppressing the aggregation of the pigment cannot be obtained, the dispersibility of the pigment after fixing is lowered, and the tinting strength is lowered.

Further, in compound (1), when n exceeds 4, charge leakage is likely to occur and fogging occurs. In addition, since the coordination with the imino groups and carbonyl groups of the quinacridone pigment is less likely to occur, the dispersibility of the pigment after fixing is lowered, and the tinting strength is lowered.

The preferred form of the toner will be described below. The amount of the compound represented by the formula (1) in the toner is preferably from 5 ppm to 500 ppm on a mass basis. Where the amount of the compound (1) is 5 ppm or more, the dispersibility of the pigment is likely to be improved. Meanwhile, where the amount is 500 ppm or less, the moisture absorption by the toner due to the hydrophilic segment of the compound (1) is appropriately maintained, and the decrease in charge in a high-humidity environment is suppressed. More preferably, the amount is from 10 ppm to 250 ppm. The amount of the compound (1) can be controlled by the addition amount thereof.

Further, it is preferable that the binder resin has an SP value $(cal/cm^3)^{0.5}$ of 9.50 to 11.50. When the SP value is in the above range, the compound (1) easily moves, and the effect of suppressing the aggregation of the quinacridone pigment is high. The SP value is more preferably from 9.60 to 10.60. The SP value of the binder resin can be controlled by the type and ratio of the monomers constituting the resin.

Further, the ratio of the amount of the pigment having a quinacridone structure to the amount of the compound represented by the formula (1) in the toner on a mass basis (pigment/compound of the formula (1)) is preferably from 100 to 10,000. This is because it is possible to suppress the decrease in charge in a high-humidity environment while exhibiting the effect of suppressing the aggregation of the pigment. More preferably, the ratio is from 200 to 5000.

In addition, the pigment having a quinacridone structure is preferably at least one selected from the group consisting of C. I. Pigment Red 122, C. I. Pigment Red 202, and C. I. Pigment Violet 19, and more preferably at least one selected from the group consisting of C. I. Pigment Red 122 and C. I. Pigment Violet 19. This is because the compound (1) is likely to be specifically coordinated since there is no strong hydrogen bond segments other than the imino groups and carbonyl groups.

Further, the n of the compound represented by the formula (1) is preferably 1 or 2, and more preferably 1. When n is 1, the compound has low hydrophilicity, can easily move inside the binder resin, and is likely to express a specific coordination to the quinacridone pigment.

Further, R of the compound represented by the formula (1) is preferably a linear alkyl group, and more preferably a linear alkyl group having from 8 to 14 carbon atoms. This is because the compound (1) can easily move inside the binder resin while exhibiting the effect of suppressing the aggregation of the pigment. More preferably, the linear alkyl group has from 10 to 12 carbon atoms.

Further, the toner preferably has a storage elastic modulus at 100° C. in the measurement of the viscoelasticity of 5,000 Pa to 25,000 Pa. This is because the compound (1) can easily move inside the binder resin while separability from the fixing device and paper during fixing and fixability to the paper are maintained. More preferably, the storage elastic modulus is from 7,000 Pa to 20,000 Pa. The storage elastic modulus can be controlled by adjusting the type and addition amount of crystalline material such as crystalline polyester or wax, or the Tg and molecular weight of the binder resin.

The method for producing the toner particles is not particularly limited, and a known method can be adopted. From the viewpoint of efficiently incorporating the compound (1) into the binder resin, a method of producing toner particles in an aqueous medium, such as a suspension polymerization method, an emulsion aggregation method, or a dissolution suspension method is preferable.

Binder Resin

The binder resin is not particularly limited, and resins conventionally used for toners can be used. Examples thereof include polyester resins, vinyl resins, polyamide resins, furan resins, epoxy resins, xylene resins, silicone resins, and the like. From the viewpoint of the SP value, the binder resin preferably includes at least one selected from the group consisting of vinyl resin and polyester resin. The binder resin is more preferably a vinyl resin. In a preferred embodiment, the toner particle has a core-shell structure having a core particle and a shell on the surface of the core particle. It is preferable that the binder resin comprised in the core particle be a vinyl resin and the shell be a polyester resin.

Examples of polymerizable monomers that can form a vinyl resin include styrene-based monomers such as styrene, α-methylstyrene, and divinylbenzene; unsaturated carboxylic acid esters (for example, (meth)acrylic acid alkyl esters with 1 to 24 carbon atoms in the alkyl group) such as methyl acrylate, butyl acrylate, methyl methacrylate, 2-hydroxyethyl methacrylate, t-butyl methacrylate, and 2-ethylhexyl methacrylate; unsaturated dicarboxylic acids such as acrylic acid and methacrylic acid; unsaturated dicarboxylic acids such as maleic acid; unsaturated dicarboxylic acid anhydrides such as maleic anhydride; nitrile-based vinyl monomers such as acrylonitrile; halogen-containing vinyl monomers such as vinyl chloride; nitrovinyl monomers such as nitrostyrene; and the like.

These can be used alone or in combination of multiple types. The vinyl resin is preferably a copolymer of monomers including styrene and an unsaturated carboxylic acid ester.

A crosslinking agent can also be used in a toner particle in order to control the molecular weight of the constituent molecules of the toner particle. As the crosslinking agent, a compound having two or more polymerizable double bonds can be used. Specific examples include aromatic divinyl compounds such as divinylbenzene and divinylnaphthalene; carboxylic acid esters having two double bonds, such as ethylene glycol diacrylate, ethylene glycol dimethacrylate, and 1,3-butanediol dimethacrylate; divinyl compounds such as divinylaniline, divinyl ether, divinyl sulfide, divinyl sulfone, and the like; and compounds having three or more vinyl groups. These crosslinking agents may be used alone or as a mixture of two or more.

These crosslinking agents are preferably used in a range of from 0.05 parts by mass to 10 parts by mass, more preferably from 0.10 parts by mass to 5 parts by mass with respect to 100 parts by mass of the polymerizable monomer.

When using a polyester resin, a known polyester resin can be used. Specific examples thereof include polycondensates of dibasic acids or derivatives thereof (carboxylic acid halides, esters, acid anhydrides) and dihydric alcohols. If necessary, trivalent or higher polybasic acids and derivatives thereof (carboxylic acid halides, esters, acid anhydrides), monobasic acids, trihydric or higher alcohols, monohydric alcohols, and the like may be used.

Examples of the dibasic acid include aliphatic dibasic acids such as maleic acid, fumaric acid, itaconic acid, oxalic acid, malonic acid, succinic acid, dodecyl succinic acid, dodecenyl succinic acid, adipic acid, azelaic acid, sebacic acid, decane-1,10-dicarboxylic acid, and the like; aromatic dibasic acids such as phthalic acid, tetrahydrophthalic acid, hexahydrophthalic acid, tetrabromophthalic acid, tetrachlorophthalic acid, HET acid, hymic acid, isophthalic acid, terephthalic acid, 2,6-naphthalenedicarboxylic acid, and the like; and the like.

Examples of derivatives of the dibasic acid include carboxylic acid halides, esters and acid anhydrides of the abovementioned aliphatic dibasic acids and aromatic dibasic acids.

Meanwhile, examples of dihydric alcohols include acyclic aliphatic diols such as ethylene glycol, 1,2-propanediol, 1,3-propanediol, 1,4-butanediol, 1,5-pentanediol, 1,6-hexanediol, diethylene glycol, dipropylene glycol, triethylene glycol, neopentyl glycol, and the like; bisphenols such as bisphenol A, bisphenol F, and the like; bisphenol A alkylene oxide adducts such as bisphenol A ethylene oxide adduct, bisphenol A propylene oxide adduct, and the like; aralkylene glycols such as xylylene diglycol and the like; isosorbide; and the like.

Examples of trivalent or higher polybasic acids and anhydrides thereof include trimellitic acid, trimellitic anhydride, pyromellitic acid, pyromellitic anhydride, and the like.

Colorant

The quinacridone pigment is not particularly limited, and known pigments having a quinacridone structure can be adopted. The quinacridone structure refers to, for example, a quinacridone skeleton represented by a following formula (A). The pigment having a quinacridone structure is, for example, a pigment having the quinacridone skeleton represented by the formula (A). The pigment having a quinacridone structure is preferably at least one selected from the group consisting of a pigment represented by the unsubstituted formula (A) and a pigment in which any hydrogen atom of the formula (A) is substituted with an arbitrary substituent. The arbitrary substituent is at least one selected from the group consisting of an alkyl group having from 1 to 4 carbon atoms (preferably 1 or 2, more preferably 1), a halogen atom (preferably Cl), an oxo group (=O), and the like.

(A)

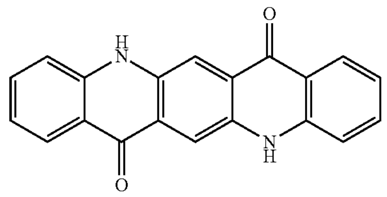

For example, at least one selected from the group consisting of C. I. Pigment Red 122, C. I. Pigment Red 202, C. I. Pigment Red 206, C. I. Pigment Red 207, C. I. Pigment Red 209, C. I. Pigment Violet 19, C. I. Pigment Violet 42, C. I. Pigment Orange 48, and C. I. Pigment Orange 49 may be used as the quinacridone pigment. The quinacridone pigment is preferably a magenta colorant or a violet colorant.

The amount of the colorant is preferably from 0.1 part by mass to 30.0 parts by mass, more preferably from 1.0 part by mass to 15.0 parts by mass, and even more preferably from 3.0 parts by mass to 8.0 parts by mass with respect to 100.0 parts by mass of the binder resin.

Wax

The toner particle preferably comprises wax. Examples of the wax include the following. Hydrocarbon waxes such as low molecular weight polyethylene, low molecular weight polypropylene, alkylene copolymers, microcrystalline wax, paraffin wax, Fischer-Tropsch wax, and the like; oxides of hydrocarbon waxes such as polyethylene oxide wax or block copolymers thereof; waxes including fatty acid esters such as carnauba wax as the main component; and partially or wholly deoxidized fatty acid esters such as deoxidized carnauba wax and the like.

Furthermore, the following can be mentioned. Saturated linear fatty acids such as palmitic acid, stearic acid, montanic acid, and the like; unsaturated fatty acids such as brassidic acid, eleostearic acid, parinaric acid, and the like; saturated alcohols such as melissyl alcohol, and the like; polyhydric alcohols such as sorbitol, and the like; esters of fatty acids such as palmitic acid, stearic acid, behenic acid, montanic acid, and the like and alcohols such as stearyl alcohol, aralkyl alcohol, behenyl alcohol, carnaubyl alcohol, ceryl alcohol, melissyl alcohol, and the like; fatty acid amides such as linoleic acid amide, oleic acid amide, lauric acid amide, and the like; saturated fatty acid bisamides such as methylene bisstearic acid amide, ethylene biscapric acid amide, ethylene bislauric acid amide, hexamethylene bisstearic acid amide, and the like; unsaturated fatty acid amides such as ethylene bisoleic acid amide, hexamethylene bisoleic acid amide, N,N'-dioleyl adipic acid amide, N,N'-dioleyl sebacic acid amide, and the like; aromatic bisamides such as m-xylene bisstearic acid amide, N, N'-distearyl isophthalic acid amide, and the like; fatty acid metal salts (generally referred to as metal soaps) such as calcium stearate, calcium laurate, zinc stearate, magnesium stearate, and the like; waxes obtained by grafting on aliphatic hydrocarbon waxes by using vinyl monomers such as styrene, acrylic acid, and the like; partial esterification products of fatty acids and polyhydric alcohols, such as behenic acid monoglyceride; and methyl esterification products having a hydroxy group that are obtained by hydrogenation of vegetable fats and oils.

Among these waxes, hydrocarbon waxes such as paraffin wax, Fischer-Tropsch wax, and the like; and ester waxes of fatty acids such as palmitic acid, stearic acid, behenic acid, montanic acid, and the like and alcohols such as stearyl alcohol, aralkyl alcohol, behenyl alcohol, carnaubyl alcohol, ceryl alcohol, melissyl alcohol, and the like are preferable from the viewpoint of improving low-temperature fixability and resistance to wraparound in fixing.

More preferably, the toner particle comprises an ester wax. The amount of the wax (preferably ester wax) is preferably from 0.5 parts by mass to 25.0 parts by mass, more preferably from 3.0 parts by mass to 20.0 parts by mass, even more preferably from 4.0 parts by mass to 17.0 parts by mass, still more preferably from 6.0 parts by mass to 14.0 parts by mass, and particularly preferably from 8.0 parts by mass to 12.0 parts by mass with respect to 100.0 parts by mass of the binder resin.

Further, from the viewpoint of achieving both toner storage stability and high-temperature offset resistance, the peak temperature of the maximum endothermic peak of the wax present within a temperature range of from 30° C. to 200° C. at the endothermic curve at the time of temperature rise measured by a differential scanning calorimeter (DSC) is preferably from 50° C. to 110° C.

Charge Control Agent

The toner may comprise a charge control agent if necessary. As the charge control agent, known ones can be used. The charge control agent may be added internally or externally to the toner particle. The amount of the charge control agent added is preferably from 0.2 parts by mass to 10.0 parts by mass with respect to 100.0 parts by mass of the binder resin.

Carrier

The toner may be mixed with a magnetic carrier and used as a two-component developer in order to obtain a stable image for a long period of time. As the magnetic carrier, the following known magnetic carriers can be used. Magnetic bodies such as surface-oxidized iron powder, unoxidized iron powder, metal particles such as iron, lithium, calcium, magnesium, nickel, copper, zinc, cobalt, manganese, chromium, rare earth, and the like, alloy particles thereof, oxide particles, ferrites, and the like, and magnetic body-dispersed resin carriers (so-called resin carriers) including magnetic bodies and a binder resin in which the magnetic bodies are held in a dispersed state.

Inorganic Fine Particles

The toner particles may be used as toner as they are or may be used as toner by externally adding various inorganic fine particles to the toner particle, if necessary. As the inorganic fine particles, for example, the following can be used. Silica, metal oxides (for example, strontium titanate, cerium oxide, alumina, magnesium oxide, and chromium oxide), nitrides (for example, silicon nitride), metal salts (for example, calcium sulfate, barium sulfate, calcium carbonate), and fatty acid metal salts (for example, zinc stearate and calcium stearate).

Inorganic fine particles can also be hydrophobized in order to improve the flowability of the toner and homogenize the charge of the toner particles. Examples of treatment agents for hydrophobizing inorganic fine particles include unmodified silicone varnish, various modified silicone varnishes, unmodified silicone oil, various modified silicone oils, silane compounds, silane coupling agents, other organosilicon compounds, and organotitanium compounds. These treatment agents may be used alone or in combination.

Any method may be used for producing the toner particles but a suspension polymerization method is preferred. For example, a polymerizable monomer that produces a binder resin, a compound represented by the formula (1), a pigment having a quinacridone structure, and if necessary, other additives such as wax and the like are mixed to obtain a polymerizable monomer composition. The polymerizable monomer composition is then added into a continuous phase (for example, an aqueous medium (which may optionally include a dispersion stabilizer)). Then, the particles of the polymerizable monomer composition are formed in the continuous phase (in the aqueous medium), and the polymerizable monomers contained in the particles are polymerized. By doing so, toner particles can be obtained.

Methods for measuring various physical properties will be described hereinbelow.

Identification and Quantification of Binder Resin and Colorant

Pyrolysis gas chromatography-mass spectrometer (hereinafter, also referred to as "pyrolysis GC/MS") and NMR are used to identify the composition and ratio of constituent compounds such as resin and colorant contained in the toner. Where the resin contained in the toner is available alone, it can be measured independently.

When the sample is a resin, pyrolysis GC/MS is used to analyze the types of constituent compounds of the resin. The type of constituent compounds is identified by analyzing the mass spectrum of components of the decomposition product of the resin, which is generated when the resin is thermally decomposed at 550° C. to 700° C. The specific measurement conditions are as follows.

Pyrolysis GC/MS Measurement Conditions

Pyrolysis device: JPS-700 (Nippon Analytical Industry Co., Inc.)

Decomposition temperature: 590° C.

GC/MS device: Focus GC/ISQ (Thermo Fisher Scientific Corp.)

Column: HP-5MS, length 60 m, inner diameter 0.25 mm, film thickness 0.25 μm

Injection port temperature: 200° C.

Flow pressure: 100 kPa

Split: 50 mL/min

MS ionization: EI

Ion source temperature: 200° C., Mass Range 45-650

Subsequently, the abundance ratios of the identified constituent compounds of the resin are measured and calculated by solid $^1$H-NMR. Structure determination is performed using nuclear magnetic resonance spectroscopy ($^1$H-NMR) [400 MHz, $CDCl_3$, room temperature (25° C.)].

Measuring device: FT NMR device JNM-EX400 (manufactured by JEOL Ltd.)

Measurement frequency: 400 MHz

Pulse condition: 5.0 μs

Frequency range: 10,500 Hz

Number of integrations: 1024 times

The mol ratio of each monomer component is obtained from the integrated value of the obtained spectrum, and the composition ratio (% by mass) is calculated based thereon.

Amount of Compound Represented by Formula (1)

Preparation of Extraction Sample

A total of 2 g of toner and 18 g of ethanol are added, homogenized by hand, and then irradiated with ultrasonic waves for 5 min. The resultant composition is allowed to stand in a thermostat at 60° C. for a whole day and night, and further allowed to stand at room temperature for 3 days. The supernatant of the resultant sample is collected and filtered through a PTFE syringe filter (pore size 250 nm), and the filtrate is used as an extraction sample.

GC/MS Analysis

The GC/MS device is GC TRACE-1310 (manufactured by Thermo Fisher Scientific Corp.), the detector is a single quadrupole analyzer MS ISQ LT (manufactured by Thermo Fisher Scientific Corp.), and the autosampler is TRIPLUS RSH (manufactured by Thermo Fisher Scientific Corp). The measurement is performed under the conditions shown below.

Sample volume: 1 μL (liquid spraying)

Column: HP5-MS (manufactured by Agilent Technologies, Inc.)

Length: 30 m, inner diameter 0.25 mm, film thickness 0.25 μm

Split ratio: 10

Split flow: 15 mL/min

Injection port temperature: 250° C.

Flow rate of helium gas in the column: 1.5 mL/min

MS ionization: EI

Column temperature condition: holding at 40° C. for 3 min, raising the temperature to 300° C. at 10° C./min and holding for 10 min.

Ion source temperature: 250° C.

Mass Range: m/z 45-1000

Transport line temperature: 250° C.

Creation of Calibration Curve

Samples for creating a calibration curve are prepared so that the concentration of the compound (1) in an ethanol solution is 10 ppm, 50 ppm, 100 ppm, and 250 ppm. These samples are measured under the aforementioned conditions, and a calibration curve is created from the area value of the peak derived from the aliphatic alcohol. The structure of the compound is determined by analyzing the above extract using an FT NMR apparatus JNM-EX400 (manufactured by JEOL Ltd.) [$^1$H-NMR 400 MHz, $CDCl_3$, room temperature (25° C.)] (also used with $^{13}$C-NMR etc.). Based on the information obtained by the above method, the amount (on a mass basis) of the compound with respect to the toner is calculated.

Method for Calculating SP Value

The SP value is obtained in the following manner according to the calculation method proposed by Fedors. For each polymerizable monomer, the evaporation energy (Δei) (cal/mol) and molar volume (Δvi) ($cm^3$/mol) are obtained from "Polym. Eng. Sci., 14 (2), 147-154 (1974)" for an atom or atomic group in the molecular structure, and $(\Sigma\Delta ei/\Sigma\Delta vi)^{0.5}$ is defined as the SP value $(cal/cm^3)^{0.5}$.

For the SP value of the binder resin, the evaporation energy (Δei) and molar volume (Δvi) of the monomer unit derived from the polymerizable monomer constituting the binder resin are obtained for each monomer unit, the respective product with the molar ratio (j) of each monomer unit in the binder unit is calculated, and the total evaporation energy of monomer units is divided by the total molar volume to obtain $\{(\Sigma j\times\Sigma\Delta ei)/(\Sigma j\times\Sigma\Delta vi)\}^{0.5}$ which is defined as the SP value $(cal/cm^3)^{0.5}$.

Storage Elastic Modulus of Toner

As a measuring device, a rotary flat-plate rheometer "ARES" (manufactured by TA INSTRUMENTS) is used. A measurement sample is obtained by pressure-molding toner (0.1 g) into a disk shape having a diameter of 7.9 mm and a thickness of 2.0±0.3 mm by using a tablet molder in an environment of 25° C. The conditions for pressure molding are 15 MPa and 60 sec.

The sample is mounted on a parallel plate, the temperature is raised from room temperature (25° C.) to 120° C. in 15 min, the shape of the sample is adjusted, and then the sample is cooled to a viscoelasticity measurement start temperature to start the measurement. At this time, the sample is set so that the initial normal force becomes zero. Further, as described below, in the subsequent measurement, the influence of the normal force can be canceled by setting to the automatic tension adjustment (Auto Tension Adjustment ON).

The measurement is performed under the following conditions.

(1) A parallel plate with a diameter of 7.9 mm is used.

(2) The frequency (Frequency) is 1.0 Hz.

(3) The applied strain initial value (Strain) is set to 0.1%.

(4) The measurement is performed at a temperature rising rate (Ramp Rate) of 2.0° C./min between 30° C. and 200° C. The measurement is performed under the following automatic adjustment mode setting conditions. The measurement is performed in the automatic strain adjustment mode (Auto Strain).

(5) The maximum strain (Max Applied Strain) is set to 20.0%.

(6) The maximum torque (Max Allowed Torque) is set to 200.0 g·cm, and the minimum torque (Min Allowed Torque) is set to 0.2 g·cm.

(7) The strain adjustment (Strain Adjustment) is set to 20.0% of Current Strain. In the measurement, an automatic tension adjustment mode (Auto Tension) is adopted.

(8) The automatic tension direction (Auto Tension Direction) is set to compression (Compression).

(9) The initial static force (Initial Static Force) is set to 10.0 g, and the automatic tension sensitivity (Auto Tension Sensitivity) is set to 40.0 g.

(10) The operating condition of automatic tension (Auto Tension) is that the sample modulus is $1.0\times10^3$ (Pa) or more.

The storage elastic modulus at 100° C. is determined by the above measurement.

Method for Measuring Weight Average Particle Diameter (D4) of Toner Particles

The weight average particle diameter (D4) of the toner particles is calculated by measuring at the number of effective measurement channels of 25,000 by using a precision particle size distribution measuring device "Coulter Counter Multisizer 3" (registered trademark, manufactured by Beckman-Coulter Inc.) equipped with a 100 μm aperture tube and based on a fine pore electrical resistance method and dedicated software "Beckman Coulter Multisizer 3 Version 3.51" (produced by Beckman-Coulter Inc.) for setting measurement conditions and analyzing measurement data, and performing analysis of measurement data. The electrolytic aqueous solution to be used for the measurement can be prepared by dissolving special grade sodium chloride in ion-exchanged water so that the concentration becomes about 1% by mass. For example, "ISOTON II" (manufactured by Beckman-Coulter Inc.) can be used.

Before performing the measurement and analysis, the dedicated software is set as follows. On a "CHANGE STANDARD MEASUREMENT METHOD (SOM) SCREEN" of the dedicated software, the total count number in the control mode is set to 50,000 particles, the number of measurement cycles to 1, and a Kd value is set to a value obtained using "STANDARD PARTICLES 10.0 μm" (manufactured by Beckman-Coulter Inc.). By pressing a threshold/noise level measurement button, the threshold and noise level are automatically set. Further, the current is set to 1600 μA, the gain to 2, and the electrolyte to ISOTON II, and the flush of the aperture tube after measurement is checked. On the "PULSE TO PARTICLE DIAMETER CONVERSION SETTING SCREEN" of the dedicated software, a bin spacing is set to a logarithmic particle diameter, a particle diameter bin to 256 particle diameter bin, and the particle diameter range from 2 μm to 60 μm. The specific measurement method is as follows.

(1) About 200 mL of the electrolytic aqueous solution is put in a 250 mL glass round-bottom beaker provided with the Multisizer 3, the beaker is set on a sample stand, and counterclockwise stirring with a stirrer rod is performed at 24 revolutions/sec. Then, dirt and air bubbles in the aperture tube are removed by the "FLUSH OF THE APERTURE TUBE" function of the dedicated software.

(2) About 30 mL of the electrolytic aqueous solution is placed in a 100 mL flat-bottomed glass beaker, and about 0.3 mL of the following diluted solution is added as a dispersing agent thereto.

Diluted solution: prepared by threefold mass dilution of "Contaminon N" (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) with ion-exchanged water.

(3) A predetermined amount of ion-exchanged water is put in a water tank of the following ultrasonic disperser in which two oscillators with an oscillation frequency of 50 kHz are built in with a phase shifted by 180 degrees and which has an electrical output of 120 W, and about 2 mL of the Contaminon N is added to the water tank.

Ultrasonic disperser: "Ultrasonic Dispersion System Tetora 150" (manufactured by Nikkaki Bios Co., Ltd.)

(4) The beaker of (2) hereinabove is set into a fixing hole of the ultrasonic disperser, and the ultrasonic disperser is operated. The height position of the beaker is adjusted so that the resonance state of the liquid level of the electrolytic solution in the beaker is maximized.

(5) With the electrolytic aqueous solution in the beaker of (4) hereinabove irradiated with ultrasonic waves, about 10 mg of toner is added little by little to the electrolytic aqueous solution and dispersed. Then, the ultrasonic dispersion processing is further continued for 60 sec. In the ultrasonic dispersion, the water temperature in the water tank is adjusted, as appropriate, to be from 15° C. to 40° C.

(6) The electrolytic aqueous solution of (5) hereinabove in which the toner was dispersed is added dropwise by using a pipette to the round-bottomed beaker of (1) that was installed in the sample stand, and the measurement concentration is adjusted to about 5%. Then, the measurement is performed until the number of measured particles reaches 50,000.

(7) The measurement data are analyzed with the dedicated software provided with the device, and the weight average particle diameter (D4) is calculated. The "average diameter" on the analysis/volume statistics (arithmetic average) screen when graph/volume % is set with the dedicated software is the weight average particle diameter (D4).

EXAMPLES

Hereinafter, the present invention will be described in more detail by way of examples. The present invention is not limited by the following examples. Unless otherwise specified, the number of parts in Examples and Comparative Examples are all based on mass.

Production of Polyester Resin 1 for Binder Resin

The monomers in amounts used that are indicated in Table 1 were placed into a reaction vessel equipped with a nitrogen introduction tube, a dewatering tube, a stirrer and a thermocouple, and 1.5 parts of dibutyltin oxide was added as a catalyst to 100 parts of the total amount of monomers. Then, after rapidly raising the temperature to 180° C. under normal pressure under a nitrogen atmosphere, water was distilled off while heating at a rate of 10° C./h from 180° C. to 210° C. to carry out polycondensation. After reaching 210° C., the pressure inside the reaction vessel was reduced to 5 kPa or less, and polycondensation was performed under the conditions of 210° C. and 5 kPa or less to obtain a polyester resin 1.

Production of Polyester Resin 2 for Binder Resin

A polyester resin 2 was produced by the same production method as the polyester resin 1, except that the raw materials were changed to those shown in Table 1.

TABLE 1

| | | Polyester resin 1 | Polyester resin 2 |
|---|---|---|---|
| Loaded monomer composition (number of parts by mass) | Terephthalic acid | 35 | 49 |
| | Trimellitic acid | 3 | 3 |
| | BPA-PO | 58 | 5 |
| | Ethylene glycol | 10 | 18 |
| | Isosorbide | 0 | 25 |
| Physical properties of resin | SP value | 10.57 | 11.54 |

BPA-PO: bisphenol A - propylene oxide (2 mol) adduct

Structure of Compound Represented by Formula (1)

Table 2 shows the structure of the compound represented by the formula (1).

TABLE 2

| | Com. a | Com. b | Com. c | Com. d | Com. e | Com. f | Com. g | Com. h | Com. i | Com. j | Com. k |
|---|---|---|---|---|---|---|---|---|---|---|---|
| n | 1 | 1 | 1 | 1 | 1 | 2 | 3 | 4 | 3 | 3 | 5 |
| R | $C_{12}H_{25}$ | $C_8H_{17}$ | $C_{14}H_{29}$ | $C_4H_9$ | $C_{22}H_{45}$ | $C_{12}H_{25}$ | $C_{12}H_{25}$ | $C_{12}H_{25}$ | $C_3H_7$ | $C_{23}H_{47}$ | $C_{12}H_{25}$ |

In Table 2, Com. represents Compound.

Production of Toner 1

Production of Polyester Resin A for Shell

The following materials were added to an autoclave equipped with a decompression device, a water separation device, a nitrogen gas introduction device, a temperature measurement device, and a stirrer.

Terephthalic acid: 32.3 parts (50.0 mol %)

Bisphenol A—propylene oxide (2 mol) adduct: 67.7 parts (50.0 mol %)

Titanium potassium oxalate (catalyst): 0.02 parts

Subsequently, the reaction was carried out under a nitrogen atmosphere at 220° C. under normal pressure until the desired molecular weight was reached. A polyester resin A was obtained by pulverizing after the temperature was lowered.

Preparation of Dispersion Liquid

To a granulation tank, 100.0 parts of ion-exchanged water, 2.0 parts of sodium phosphate, and 0.9 part of 10% by mass hydrochloric acid were added to prepare an aqueous sodium phosphate solution, which was heated to 50° C. A calcium chloride aqueous solution prepared by dissolving 1.2 parts of calcium chloride hexahydrate in 8.2 parts of ion-exchanged water was added to this granulation tank, and stirring was performed at a peripheral speed of 25 m/s for 30 min by using TK Homomixer (trade name, manufactured by Tokushu Kika Kogyo Co., Ltd.). As a result, a dispersion liquid (aqueous dispersion liquid) including calcium phosphate (fine particles) as inorganic fine particles with poor solubility in water was obtained.

Preparation of Pigment-Dispersed Composition

Polymerizable monomer (styrene): 39.0 parts

Colorant (C. I. Pigment Red 122): 5.0 parts

Compound a: 0.0028 parts

The above materials were introduced into an attritor (manufactured by Nippon Coke & Eng. Co., Ltd.) and stirred at 200 rpm at 25° C. for 180 min using zirconia beads having a radius of 1.25 mm to prepare a pigment-dispersed composition.

Preparation of Colorant-Containing Composition

The following materials were put into the same container and mixed and dispersed at a peripheral speed of 20 m/s by using TK Homomixer (trade name, manufactured by Tokushu Kika Kogyo Co., Ltd.).

The above pigment-dispersed composition: 44.0028 parts

Polymerizable monomer (styrene): 31.0 parts

Polymerizable monomer (n-butyl acrylate): 30.0 parts

Polyester resin A: 2.0 parts

Crosslinking agent (divinylbenzene): 0.5 parts

Further, after heating to 60° C., 10.0 parts of wax (behenyl behenate) was added, and dispersing and mixing were performed for 30 min to prepare a colorant-containing composition.

Preparation of Polymerizable Monomer Composition Particles

The colorant-containing composition was put into the dispersion liquid including calcium phosphate fine particles, and stirring was performed with TK Homomixer (trade name, manufactured by Tokushu Kika Kogyo Co., Ltd.) at a peripheral speed of 30 m/s at a temperature of 60° C. and under a nitrogen atmosphere. A total of 9.0 parts of t-butyl peroxypivalate (manufactured by Nippon Oil & Fats Co., Ltd., trade name "Perbutyl PV", molecular weight: 174.2, 10-h half-life temperature: 58° C.) as a polymerization initiator was added to the stirred composition to prepare a dispersion liquid including polymerizable monomer composition particles.

Next, the dispersion liquid of the polymerizable monomer composition particles was transferred to another tank, heated to a temperature of 70° C. while stirring with a paddle stirring blade, reacted at 70° C. for 5 h, and then the liquid temperature was set to 85° C. and the reaction was further conducted for 2 h. Then, while maintaining stirring, dilute hydrochloric acid was added until the pH reached 1.5 to dissolve the dispersion stabilizer. The solid fraction was separated by filtration, thoroughly washed with ion-exchanged water, and then vacuum dried at 40° C. for 24 h to obtain toner particles 1 having a weight average particle size (D4) of 6.8 μm.

External Addition Step

To 100 parts of the toner particles 1 obtained as described above, 1.5 parts of hydrophobic silica (RY50, manufactured by Nippon Aerosil Co., Ltd.) was added and mixed using Mitsui Henschel Mixer (manufactured by Mitsui Miike Machinery Co., Ltd.). Then, the toner 1 was obtained by sieving with a vibrating sieve having an opening of 45 μm.

Production of Toners 2 to 13

In the preparation of the pigment-dispersed composition of toner 1, the type of colorant, the type of compounds added, and the amount added were changed as shown in Table 3. Further, toners 2 to 13 were obtained in the same manner, except that in the preparation of the colorant-containing composition, the amount of wax (behenyl behenate) was changed.

TABLE 3

| | Compound (1) | | | Behenyl behenate |
|---|---|---|---|---|
| | Type | Amount added (number of parts) | Colorant Type | Amount added (number of parts) |
| Toner 1 | Compound a | 0.0028 | PR122 | 10.0 |
| Toner 2 | Compound a | 0.0008 | PV19 | 10.0 |
| Toner 3 | Compound a | 0.0004 | PR122 | 10.0 |
| Toner 4 | Compound a | 0.0029 | PR122 | 15.0 |
| Toner 5 | Compound a | 0.0028 | PR122 | 5.0 |
| Toner 6 | Compound b | 0.0029 | PR122 | 10.0 |
| Toner 7 | Compound c | 0.0027 | PR122 | 10.0 |
| Toner 8 | Compound d | 0.0029 | PR122 | 10.0 |
| Toner 9 | Compound e | 0.0028 | PR122 | 10.0 |
| Toner 10 | Compound f | 0.0026 | PR122 | 10.0 |
| Toner 11 | Compound g | 0.0028 | PR122 | 10.0 |
| Toner 12 | Compound h | 0.0027 | PR122 | 10.0 |
| Toner 13 | Compound a | 0.0028 | PR202 | 10.0 |
| Toner 14 | Compound a | 0.0027 | PR122 | 10.0 |
| Toner 15 | Compound a | 0.0029 | PR122 | 10.0 |
| Toner 16 | Described in the description | | | |
| Toner 17 | | | | |
| Toner 18 | | | | |
| Toner 19 | | | | |
| Toner 20 | Compound g | 0.0027 | PR238 | 10.0 |
| Toner 21 | None | None | PR122 | 10.0 |
| Toner 22 | Compound i | 0.0022 | PR122 | 10.0 |
| Toner 23 | Compound j | 0.0026 | PR122 | 10.0 |
| Toner 24 | Compound k | 0.0031 | PR122 | 10.0 |

In the table, the abbreviations are as follows.
PR122: C.I. Pigment Red 122
PV19: C.I. Pigment Violet 19
PR202: C.I. Pigment Red 202
PR238: C.I. Pigment Red 238

Production of Toner 14

In the preparation of the pigment-dispersed composition of toner 1, the type of colorant was changed as shown in Table 3. Further, toner 14 was obtained in the same manner, except that in the preparation of the colorant-containing composition of toner 1, the polymerizable monomers were changed as follows.

Polymerizable monomer (styrene): 16.0 parts

Polymerizable monomer (behenyl acrylate): 35.0 parts

Polymerizable monomer (methyl methacrylate): 10.0 parts

Production of Toner 15

In the preparation of the pigment-dispersed composition of toner 1, the type of colorant was changed as shown in Table 3. Further, toner 15 was obtained in the same manner, except that in the preparation of the colorant-containing composition of toner 1, the polymerizable monomers were changed as follows.

Polymerizable monomer (styrene): 26.0 parts

Polymerizable monomer (behenyl acrylate): 30.0 parts

Polymerizable monomer (methyl methacrylate): 5.0 parts

Production of Toner 16

Preparation of Polyester Resin Particle-Dispersed Solution

Polyester resin 1: 200.0 parts

Ion-exchanged water: 500.0 parts

The above materials were placed in a stainless steel container, heated and melted at 95° C. under a warm bath, and 0.1 mol/L of sodium hydrogen carbonate was added to increase pH to above 7.0 while sufficiently stirring at 7800 rpm by using a homogenizer (Ultra-Turrax T50, manufactured by IKA). Then, a mixed solution of 3 parts of sodium dodecylbenzenesulfonate and 297 parts of ion-exchanged water was gradually added dropwise to emulsify and disperse the mixture to obtain a polyester resin particle-dispersed solution. When the particle size distribution of this polyester resin particle-dispersed solution was measured using a particle size measuring device (LA-950, manufactured by Horiba, Ltd.), the number average particle diameter of the contained polyester resin particle-dispersed solution was 0.25 μm. No coarse particles larger than 1 μm were observed.

Preparation of Wax Particle-Dispersed Solution

Ion-exchanged water: 500.0 parts

Behenyl behenate: 250.0 parts

The above materials were placed in a stainless steel container, heated and melted at 95° C. under a warm bath, and 0.1 mol/L of sodium hydrogen carbonate was added to increase pH to above 7.0 while sufficiently stirring at 7800 rpm by using a homogenizer (Ultra-Turrax T50, manufactured by IKA). Then, a mixed solution of 5 parts of sodium dodecylbenzenesulfonate and 245 parts of ion-exchanged water was gradually added dropwise to emulsify and disperse the mixture to obtain a wax particle-dispersed solution. When the particle size distribution of this wax particle-dispersed solution was measured using the particle size measuring device (LA-920, manufactured by Horiba, Ltd.), the number average particle diameter of the contained wax particle-dispersed solution was 0.35 μm. No coarse particles larger than 1 μm were observed.

Preparation of Colorant Particle-Dispersed Solution

Colorant (C. I. Pigment Red 122): 100.0 parts

Sodium dodecylbenzenesulfonate: 5.0 parts

Compound a: 0.85 parts

Ion-exchanged water: 400.0 parts

The above materials were mixed and dispersed using a sand grinder mill. When the particle size distribution of the colorant particles contained in the colorant particle-dispersed solution was measured using the particle size measuring device (LA-920, manufactured by Horiba, Ltd.), the number average particle size of the colorant particles contained was 0.2 μm, and no coarse particles larger than 1 μm were observed.

Production of Toner Particles 16

Polyester resin particle-dispersed solution: 500.0 parts

Colorant particle-dispersed solution: 25.5 parts

Wax particle-dispersed solution: 40.0 parts

Sodium dodecylbenzenesulfonate: 5.0 parts

The polyester resin particle-dispersed solution, wax particle-dispersed solution and sodium dodecylbenzenesulfonate were put in a reactor (flask having a volume of 1 liter, anchor blade with baffle) and mixed uniformly. Meanwhile, the colorant particle-dispersed solution was uniformly mixed in a 500 mL beaker and gradually added to the reactor while stirring to obtain a mixed dispersion liquid. While stirring the obtained mixed dispersion liquid, 1 part of aqueous aluminum sulfate solution was added dropwise as a solid fraction to form aggregated particles.

After completion of dropwise addition, the atmosphere inside of the system was replaced with nitrogen, followed by keeping at 50° C. for 1 h and then at 55° C. for 1 h. Then, the temperature was raised and kept at 90° C. for 30 min. Then, the temperature was lowered to 63° C. and then kept for 3 h to form fused particles. After a predetermined time, toner particles 16 were obtained by cooling to room temperature (about 25° C.) at a temperature lowering rate of 0.5° C. per minute, washing, filtering, solid-liquid separating, and then drying using a vacuum dryer.

External Addition Step

Toner 16 was obtained in the same manner as in the external addition step of the toner particles 1, except that the toner particles 16 were used.

Production of Toner 17

In the preparation of the polyester resin particle-dispersed solution of toner 16, the polyester resin 1 was replaced with the polyester resin 2. Further, toner 17 was obtained in the same manner, except that in the preparation of the colorant particle-dispersed solution, the amount of compound a was changed to 0.95 parts.

Production of Toner 18

Toner 18 was obtained in the same manner, except that in the preparation of the colorant particle-dispersed solution of the toner 16, the amount of compound a was changed to 1.10 parts.

Production of Toner 19

Preparation of Dispersion Liquid

A total of 250.0 parts of ion-exchanged water and 10.2 parts of magnesium chloride were dissolved in a granulation tank to prepare an aqueous magnesium chloride solution. An aqueous solution prepared by dissolving 6.2 parts of sodium hydroxide in 50.0 parts of ion-exchanged water was gradually added to the granulation tank while stirring at a peripheral speed of 25 m/s by using TK Homomixer (trade name, manufactured by Tokushu Kika Kogyo Co., Ltd.) to obtain a dispersion liquid containing (fine particles of) magnesium hydroxide.

Preparation of Pigment-Dispersed Composition

Polymerizable monomer (styrene): 39.0 parts

Colorant (C. I. Pigment Red 122): 5.0 parts

Compound a: 0.003 parts

The above materials were introduced into an attritor (manufactured by Nippon Coke & Eng. Co., Ltd.) and stirred at 200 rpm at 25° C. for 180 min using zirconia beads having a radius of 1.25 mm to prepare a pigment-dispersed composition.

Preparation of Colorant-Containing Composition

The following materials were put into the same container and mixed and dispersed at a peripheral speed of 20 m/s by using TK Homomixer (trade name, manufactured by Tokushu Kika Kogyo Co., Ltd.).

The above pigment-dispersed composition: 44.003 parts

Polymerizable monomer (styrene): 31.0 parts

Polymerizable monomer (n-butyl acrylate): 30.0 parts

Charge control agent: FCA-5 (trade name, manufactured by Fujikura Kasei Co., Ltd.): 1.2 parts Crosslinking agent (divinylbenzene): 0.5 parts Further, after heating to 60° C., 10.0 parts of wax (behenyl behenate) was added, and the components were dispersed and mixed for 30 min to prepare a colorant-containing composition.

Preparation of Polymerizable Monomer Composition Particles

The colorant-containing composition was put into a dispersion liquid containing magnesium hydroxide fine particles, and stirring was performed at a peripheral speed of 30 m/s with TK Homomixer (trade name, manufactured by Tokushu Kika Kogyo Co., Ltd.) under a nitrogen atmosphere at a temperature of 60° C. A total of 9.0 parts of t-butyl peroxypivalate (manufactured by Nippon Oil & Fats Co., Ltd., trade name "Perbutyl PV", molecular weight: 174.2, 10-h half-life temperature: 58° C.) as a polymerization initiator was added to the stirred composition to prepare a dispersion liquid including polymerizable monomer composition particles.

Next, the dispersion liquid of the polymerizable monomer composition particles was transferred to another tank, and the temperature was raised to 70° C. while stirring with a paddle stirring blade to carry out a polymerization reaction. When the conversion ratio of the polymerizable monomers reached 95%, the temperature was raised to 90° C., and 2.0 parts of methyl methacrylate as a polymerizable monomer and an aqueous solution prepared by dissolving 0.2 parts of 2,2'-azobis(N-butyl-2-methylpropionamide) in 10 parts of ion-exchanged water as a water-soluble initiator were added. The polymerization reaction was carried out at 90° C. for 3 h to obtain a polymerization reaction solution (polymerization slurry) including toner particles 19.

After cooling, sulfuric acid was added to bring the pH to 6.5 or less, and stirring was performed for 2 h to dissolve inorganic fine particles having poor solubility in water and located on the surface of the toner particles. The dispersion liquid of the toner particles was filtered, followed by washing with water and drying at a temperature of 40° C. for 48 h to obtain toner particles 19 having a core-shell structure and a weight average particle diameter (D4) of 6.8 μm.

External Addition Step

A total of 100.0 parts of toner particles 19 and 1.5 parts of dry silica particles ("AEROSIL (registered trademark) REA90" manufactured by Nippon Aerosil Co., Ltd.: positive-charging hydrophobized silica particles) were mixed for 3 min using FM Mixer (Nippon Coke & Eng. Co., Ltd) to attach silica particles to the toner particles 19. Then, toner 19 was obtained by sieving with 300 mesh (opening 48 μm).

Production of Toners 20 to 24

In the preparation of the pigment-dispersed composition of toner 1, the type of colorant, the types of compounds added, and the amounts added were changed as shown in Table 3. Further, toners 20 to 24 were obtained in the same manner, except that in the preparation of the colorant-containing composition of toner 1, the polymerizable monomers were changed to those of toner 14. The toner 21 denoted by "None" in Table 3 does not contain the compound (1).

Physical Properties of Toners 1 to 24

The abovementioned various physical properties were measured using toners 1 to 24, and the obtained physical properties are shown in Table 4.

TABLE 4

| | Amount of compound (1) ppm | SP value of binder resin $(cal/cm^3)^{0.5}$ | Colorant/Compound (1) ratio | Storage elastic modulus (100° C.) Pa |
|---|---|---|---|---|
| Toner 1 | 24 | 9.80 | 2083 | 9830 |
| Toner 2 | 7 | 9.80 | 7143 | 10019 |
| Toner 3 | 3 | 9.80 | 16667 | 10231 |
| Toner 4 | 25 | 9.80 | 2000 | 5239 |
| Toner 5 | 24 | 9.80 | 2083 | 24773 |
| Toner 6 | 25 | 9.80 | 2000 | 10020 |
| Toner 7 | 23 | 9.80 | 2173 | 10852 |
| Toner 8 | 25 | 9.80 | 2000 | 9531 |
| Toner 9 | 24 | 9.80 | 2083 | 11038 |
| Toner 10 | 22 | 9.80 | 2273 | 10345 |
| Toner 11 | 24 | 9.80 | 2083 | 11332 |
| Toner 12 | 23 | 9.80 | 2174 | 11057 |
| Toner 13 | 24 | 9.80 | 2083 | 10132 |
| Toner 14 | 23 | 9.49 | 2174 | 3964 |
| Toner 15 | 25 | 9.53 | 2000 | 5053 |
| Toner 16 | 435 | 10.57 | 115 | 23153 |
| Toner 17 | 490 | 11.54 | 102 | 25621 |
| Toner 18 | 530 | 10.57 | 94 | 22989 |
| Toner 19 | 25 | 9.80 | 2000 | 11312 |
| Toner 20 | 23 | 9.49 | 2174 | 3964 |
| Toner 21 | 0 | 9.49 | — | 4231 |
| Toner 22 | 19 | 9.49 | 2632 | 3889 |
| Toner 23 | 22 | 9.49 | 2273 | 3943 |
| Toner 24 | 26 | 9.49 | 1923 | 3808 |

Image Evaluation

As an image forming apparatus, a color laser beam printer (HP LaserJet Enterprise Color M652n) manufactured by Hewlett-Packard Co. was used, and the process speed was modified to be 300 mm/sec. An HP 656X genuine LaserJet toner cartridge (magenta) was used as a cartridge. The product toner was removed from the inside of the cartridge, and the cartridge was cleaned by air blow and then filled with 300 g of toner to be evaluated. The toner was evaluated by performing the following test using the above cartridge. The evaluation was carried out by mounting the above cartridge on the magenta station and mounting dummy cartridges on other stations. Since only the toner 19 is a positive-charging toner, various potential settings were changed to enable the development of the positive-charging toner.

Evaluation of Fogging

A total of 300 g of toner was allowed to stand for 30 days in a thermostat at 40° C. and 95% RH, and the toner after staying under such severe conditions was evaluated. As the evaluation condition, the reflectance (%) of a non-image portion was measured by "REFLECTOMETER MODEL TC-6DS" (manufactured by Tokyo Denshoku Co., Ltd.) in a high-temperature and high-humidity environment (temperature 32° C./humidity 85% RH). The evaluation was performed using a numerical value (%) obtained by subtracting the obtained reflectance from the reflectance (%) of the unused printout paper (standard paper) measured in the same manner. The smaller the numerical value, the more the image fogging is suppressed. The evaluation was performed using plain paper (HP Brochure Paper 200 g, Glossy, manufactured by HP Co., 200 $g/m^2$) in a gloss paper mode.

Evaluation Criteria

A: Difference in reflectance is less than 0.5%

B: Difference in reflectance is 0.5% or more and less than 1.5%

C: Difference in reflectance is 1.5% or more and less than 3.0%

D: Difference in reflectance is 3.0% or more

Image Density

The tinting strength of the toner was evaluated by the image density of a solid image (toner laid-on level: 0.8 $mg/cm^2$). A "Macbeth reflection densitometer RD918" (manufactured by Macbeth) was used to measure the image density, and the relative density of a white background portion having an original density of 0.00 was measured with respect to the printout image. As the recording medium, LETTER size plain paper (XEROX 4200, manufactured by XEROX Corp., 75 g/$m^2$) was used.

Evaluation Criteria

A: Image density is 1.45 or higher

B: Image density is 1.30 or more and less than 1.45

C: Image density is 1.15 or more and less than 1.30

D: Image density is less than 1.15

Low-Temperature Fixability

As the recording medium, LETTER size plain paper (XEROX 4200, manufactured by XEROX Corp., 75 g/$m^2$) was used. Next, using the filled toner, an unfixed image of 2.0 cm in length and 15.0 cm in width was formed on a portion of 1.0 cm from the upper end with respect to the paper passing direction so that the toner laid-on level was 0.20 mg/$cm^2$. Next, the removed fixing unit was modified so that the fixing temperature and process speed could be adjusted, and the fixing test of the unfixed image was performed using the modified fixing unit.

First, the unfixed image was fixed at each temperature by setting the process speed to 300 mm/s and the fixing line pressure to 27.4 kgf under a normal temperature and humidity environment (23° C., 60% RH). The evaluation criteria for low-temperature fixability are presented hereinbelow. The low-temperature-side fixing onset temperature is the lowest temperature (low-temperature-side fixing onset temperature) at which the density decrease rate of image density before and after rubbing was 10.0% or less when the surface of the image was rubbed 5 times at a speed of 0.2 m/sec with Silbon paper (Dusper K-3) to which a load of 4.9 kPa (50 g/$cm^2$) was applied. Where the fixing is not performed firmly, the image density decrease rate tends to increase.

Evaluation Criteria

A: Low-temperature-side fixing onset temperature is lower than 120° C.

B: Low-temperature-side fixing onset temperature is 120° C. or higher and lower than 135° C.

C: Low-temperature-side fixing onset temperature is 135° C. or higher and lower than 150° C.

D: Low-temperature-side fixing onset temperature is 150° C. or higher.

Separability

The toner separability was evaluated by visually observing whether wraparound occurred at the time of fixing. In a high-temperature and high-humidity environment (temperature 32° C./humidity 85% RH), a solid image (toner laid-on level: 0.8 mg/$cm^2$) was output by opening a tip margin of 3 mm in the longitudinal direction of plain paper (XEROX 4200, manufactured by XEROX Corp., 75 g/$m^2$), and fixing was performed at each fixing temperature while gradually raising the set temperature by 5° C. The upper limit temperature at which wraparound did not occur was defined as the separability temperature during fixing. The separability temperature during fixing was evaluated according to the following evaluation criteria.

Evaluation Criteria

A: Separability temperature during fixing is 160° C. or higher

B: Separability temperature during fixing is 150° C. or higher and lower than 160° C.

C: Separability temperature during fixing is 140° C. or higher and lower than 150° C.

D: Separability temperature during fixing is lower than 140° C.

Examples 1 to 19

In Examples 1 to 19, the above evaluation was performed using toners 1 to 19, respectively. The evaluation results are shown in Table 5.

Comparative Examples 1 to 5

In Comparative Examples 1 to 5, the above evaluation was performed using toners 20 to 24, respectively. The evaluation results are shown in Table 5.

TABLE 5

| | | Fogging | | Image density | | Low-temperature fixability | | Separability | |
|---|---|---|---|---|---|---|---|---|---|
| | | Rank | % | Rank | | Rank | ° C. | Rank | ° C. |
| Example 1 | Toner 1 | A | 0.2 | A | 1.58 | A | 119 | A | 160 |
| Example 2 | Toner 2 | A | 0.1 | B | 1.35 | A | 119 | A | 160 |
| Example 3 | Toner 3 | A | 0.1 | C | 1.21 | A | 118 | A | 160 |
| Example 4 | Toner 4 | A | 0.2 | A | 1.52 | A | 114 | B | 155 |
| Example 5 | Toner 5 | A | 0.3 | A | 1.60 | B | 124 | A | 160 |
| Example 6 | Toner 6 | A | 0.1 | A | 1.51 | A | 118 | A | 160 |
| Example 7 | Toner 7 | A | 0.3 | A | 1.53 | A | 119 | A | 160 |
| Example 8 | Toner 8 | A | 0.2 | C | 1.28 | A | 119 | A | 160 |
| Example 9 | Toner 9 | A | 0.4 | C | 1.29 | A | 120 | A | 160 |
| Example 10 | Toner 10 | B | 1.0 | B | 1.33 | A | 119 | A | 160 |
| Example 11 | Toner 11 | C | 1.7 | C | 1.20 | A | 120 | A | 160 |
| Example 12 | Toner 12 | C | 2.7 | C | 1.17 | A | 119 | A | 160 |
| Example 13 | Toner 13 | A | 0.3 | B | 1.43 | A | 118 | A | 160 |
| Example 14 | Toner 14 | A | 0.3 | B | 1.35 | A | 110 | C | 145 |
| Example 15 | Toner 15 | A | 0.2 | B | 1.41 | A | 113 | B | 150 |
| Example 16 | Toner 16 | B | 1.2 | B | 1.43 | B | 130 | A | 160 |
| Example 17 | Toner 17 | B | 1.4 | C | 1.23 | C | 137 | A | 160 |
| Example 18 | Toner 18 | C | 1.9 | B | 1.39 | B | 129 | A | 160 |
| Example 19 | Toner 19 | A | 0.1 | A | 1.60 | B | 121 | A | 160 |
| Comparative Example 1 | Toner 20 | C | 1.9 | D | 1.14 | A | 118 | C | 145 |
| Comparative Example 2 | Toner 21 | C | 1.8 | D | 1.12 | A | 119 | C | 145 |
| Comparative Example 3 | Toner 22 | C | 2.4 | D | 1.13 | A | 118 | C | 150 |
| Comparative Example 4 | Toner 23 | C | 2.1 | D | 1.11 | A | 119 | C | 145 |
| Comparative Example 5 | Toner 24 | D | 3.0 | D | 1.10 | A | 117 | C | 150 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-096043, filed Jun. 8, 2021, which is hereby incorporated by reference herein in its entirety.

What is claimed is:

1. A toner, comprising:

a toner particle comprising a binder resin, a pigment having a quinacridone structure, and a compound represented by formula (1)

(1)

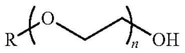

when R represents a linear or branched alkyl group having 8 to 18 carbon atoms, and n is an integer of 1 or 2, wherein an amount of the compound represented by formula (1) in the toner is 5 to 500 ppm on a mass basis, and the toner has a storage elastic modulus at 100° C. in a viscoelasticity measurement of 5,000 to 25,000 Pa.

2. The toner according to claim 1, wherein the binder resin has an SP value $(cal/cm^3)^{0.5}$ of 9.50 to 11.50.

3. The toner according to claim 1, wherein a ratio of an amount of the pigment to an amount of the compound represented by formula (1) in the toner is 100 to 10,000 on a mass basis.

4. The toner according to claim 1, wherein the pigment is at least one member selected from the group consisting of C. I. Pigment Red 122, C. I. Pigment Red 202 and C. I. Pigment Violet 19.

5. The toner according to claim 1, wherein n is 1.

6. The toner according to claim 1, wherein the binder resin has an SP value $(cal/cm^3)^{0.5}$ of 9.60 to 10.60.

7. The toner according to claim 1, wherein the toner particle further comprises an ester wax.

8. The toner according to claim 7, wherein an amount of the ester wax is 6.0 to 14.0 parts by mass with respect to 100.0 parts by mass of the binder resin.

* * * * *